July 6, 1965 H. J. BAERT 3,192,917
DISPOSABLE OVEN LINER
Filed Jan. 5, 1962 2 Sheets-Sheet 1
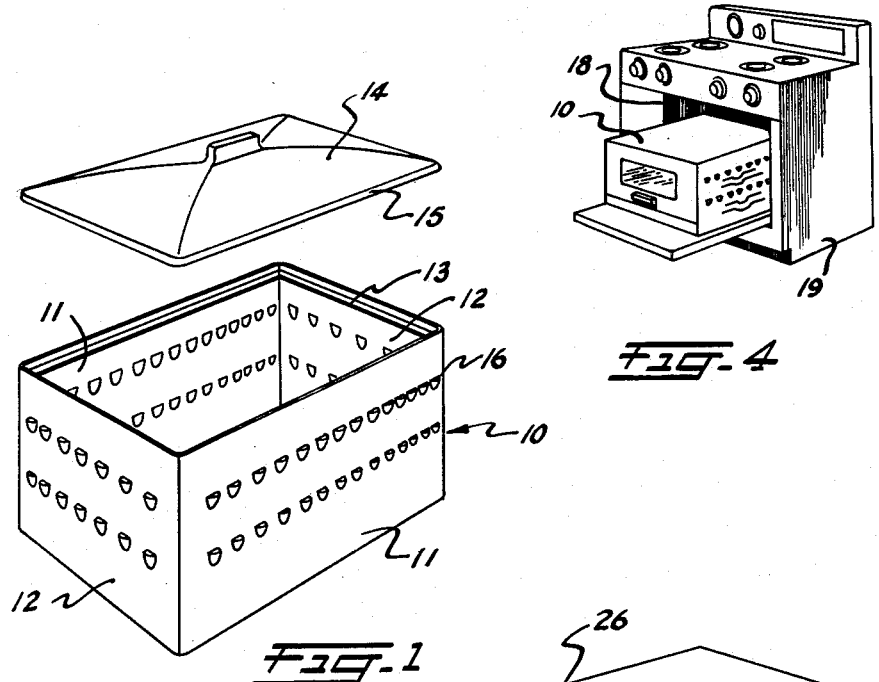
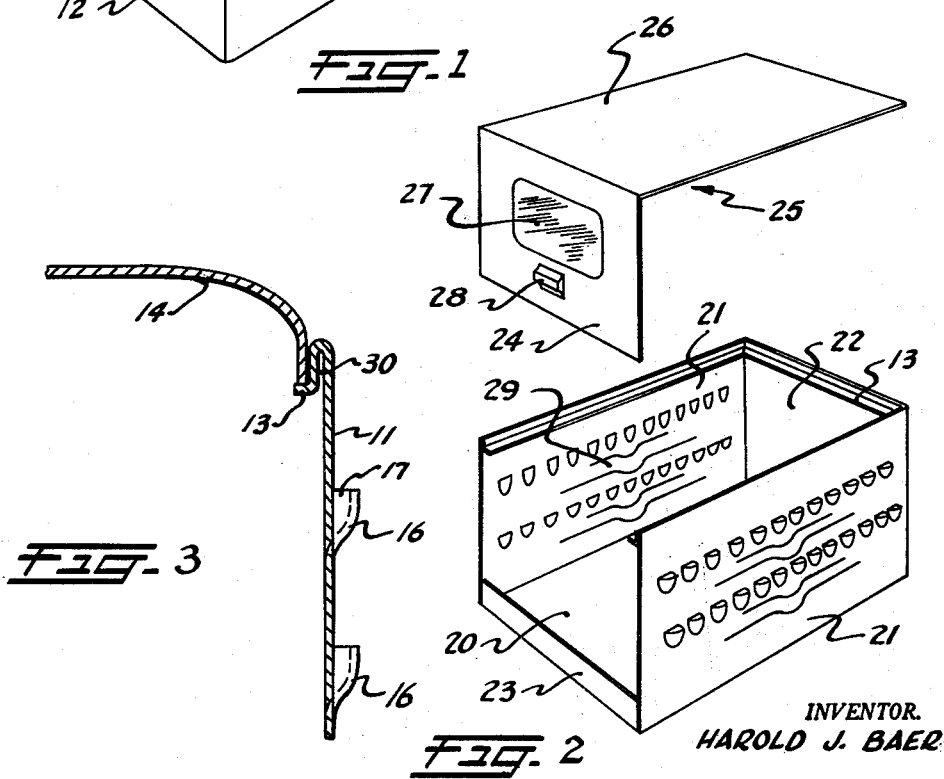
INVENTOR.
HAROLD J. BAERT July 6, 1965 H. J. BAERT 3,192,917
DISPOSABLE OVEN LINER
Filed Jan. 5, 1962 2 Sheets-Sheet 2
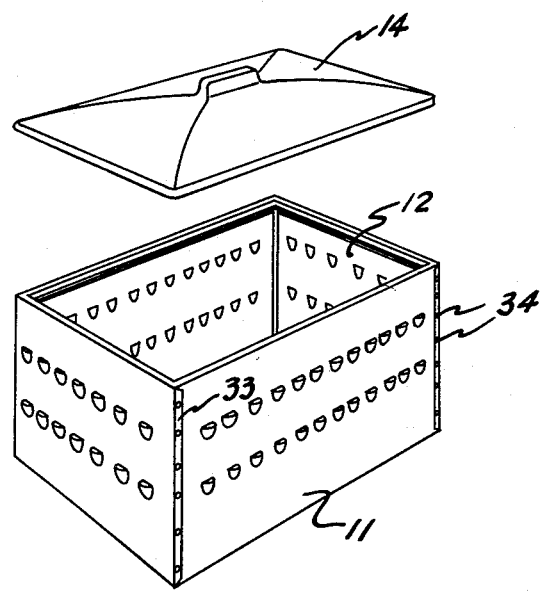
Fig. 5
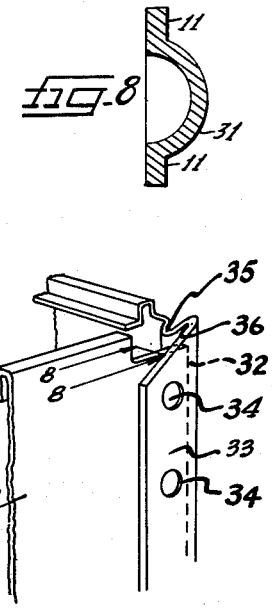
Fig. 8
Fig. 6
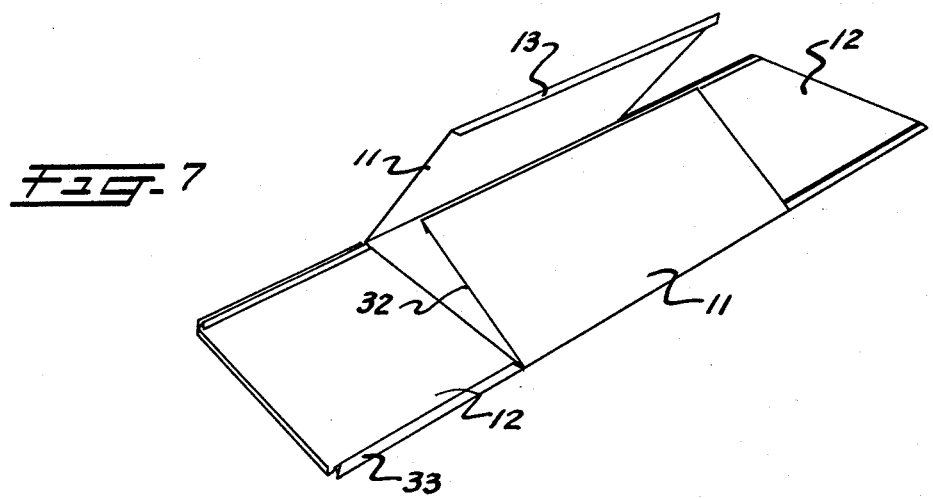
Fig. 7
INVENTOR
HAROLD J. BAERT

United States Patent Office 3,192,917
Patented July 6, 1965

3,192,917
DISPOSABLE OVEN LINER
Harold J. Baert, Minneapolis, Minn.
(3406B Elizabeth, Lynwood, Calif.)
Filed Jan. 5, 1962, Ser. No. 164,538
1 Claim. (Cl. 126—19)

This invention relates generally to household cooking ovens, and more specifically to a disposable oven liner which may be removably positioned therein to provide complete protection for the inner surfaces of the oven.

The task of cleaning a badly soiled oven is a familiar experience in most homes, and constitutes an extremely unpleasant and arduous project. Although some attempt has been made to provide removable liners for use within a cooking range oven, little success has been achieved and such liners could not readily be considered in the disposable class. My invention is directed towards the provision of an economical liner which fully utilizes the available space in the oven and is provided with suitable covering so as to create a completely spatter-proof container in which foods may be effectively cooked. The oven liner of my invention may be readily assembled within a minimum of time and incorporates ventilation and rack support features of novel configuration.

It is therefore a primary object of this invention to provide a disposable oven liner which may be used in the form of a completely closed container which is readily accessible for inspection and which ensures that all spatter is retained within the liner.

It is a further object of this invention to provide a disposable oven liner which may be readily constructed from a flattened shape suitable for multiple packaging and shipping purposes.

It is a still further object of this invention to provide a disposable oven liner of the above class which completely eliminates the need for periodic oven cleaning and may be readily manufactured for retail at reasonable cost.

A full understanding of the construction of this invention, together with further novel features and advantages, will become apparent by reference to the following detailed description of several embodiments thereof, taken in conjunction with the attached drawings wherein:

FIG. 1 is a perspective view of the disposable oven liner constructed according to one embodiment of my invention.

FIG. 2 is a perspective view of the disposable liner having a front and top lid portion permitting complete access thereto.

FIG. 3 is a fragmentary cross sectional view showing how the lid is seated in the liner, and showing the construction of the ventilation ports.

FIG. 4 is a perspective view of a cooking range with the liner shown in FIG. 2, being used in conjunction with the oven.

FIG. 5 is a perspective view of an oven liner with lid constructed for erection from flat forms.

FIG. 6 is a fragmentary perspective view showing how the corners of the oven interlock with each other.

FIG. 7 is a perspective view showing a liner being folded into shape from the flat form used for shipping purposes.

FIG. 8 is a sectional view of this invention taken substantially along line 8—8 of FIGURE 6 as viewed in the direction indicated by the arrows.

Similar reference characters indicate corresponding parts throughout the several views in the drawings.

Referring now to the drawings in detail, the numeral 10 represents a substantially rectangular container having parallel side walls 11 connected together by end walls 12. The walls are made of thin aluminum sheet about .007 inch thick and are shaped along their upper edge so as to provide an inwardly extending lip 13 around the periphery of the container for removably receiving and supporting a dome shaped lid 14 thereon. The construction of the lip will be readily understood by reference to FIG. 3, of the drawing, the lid 14 having short vertical sides 15 which locate within the front upper edge of the container wall. Ventilation ports 16 may be formed in rows around the periphery of the container and are stamped into the side and end walls so as to form outwardly and upwardly extending troughs 17 which prevent grease and spatter from contaminating the sides of an oven such as 18 forming part of the range generally indicated at 19.

FIG. 2, shows a slight modification of the above described liner and consists of a base 20, opposed side walls 21 and a single connecting end wall 22. A small flange 23 upstands from the front of the base 20 to form a stop against which a removable front panel 24 may engage. A lid 25 comprises a flat top section 26 which is adapted to locate on a peripheral lip 13 projecting inwardly from the side and end walls, and the top is connected at one end to the upper edge of the front panel 24 to form a single closure for the container. The front panel may incorporate a transparent window 27 for visual inspection purposes, and is provided with a hand grip 28 for assisting in removing the lid from the liner. Elongated depressions 29 may be formed in the side walls for location within the rack grooves of the oven so as to enable conventional racks to be used within the liner. If desired, the liner may be made of shorter depth than that of the oven such that the base 20 may be supported by one of the oven racks so as to permit better circulation of heat beneath the base of the container.

It is intended that these liner units be assembled from substantially flat shapes wherein the end walls 12 are disposed in the plane of the base and the side walls 11 are folded one upon each other in an overlapping manner with respect to the base. It is further proposed that a number of such liners be stamped in groups wherein each successive liner is very slightly smaller than the former so that the group of liners may be stacked in a compact and efficient manner. The upper edges of the side walls 11 and 12 are crimped to form an inwardly directed U shaped groove 30 which provide rigidity for the said edge and permits the lip 13 to be inwardly spaced therefrom. Such lip construction ensures the spatter-proof seal between the lid and the container.

Rapid assembly of the oven liner is made possible in the following manner. The side walls 11 are provided with two vertically spaced depressions 31 adjacent their vertical end edges 32. These depressions form protruding buttons on the outer side of the wall which are utilized for snap engagement by flaps 33 which depend from the vertical side edges of the end walls 12 and have holes 34 punched therethrough for engagement by the protruding buttons formed in the side walls. Permanent engagement of the buttons within the holes 34 is assured due to a crimped rib 35 which is formed intermediate the flaps 33 and the end edges 32 so as to form a locating slot 36 at the innermost end of the flap and adjacent the inner face thereof.

It will be appreciated that the precise dimensions of the oven liner and the choice of features to be incorporated therein is a matter of choice, and further, that the method of connecting the side and end walls of the container together has been described by way of example only, such modifications and changes being considered within the scope of this invention, as defined in the appended claim.

I claim:

A disposable oven liner of the character described, comprising a single sheet of thin aluminium cut to fold into a rectangular container, each end of which has its vertical edge terminating in a crimped rib forming an intermediate flap and an outer flap, the outer flap having a plurality of vertically disposed and equally spaced circular openings therein, the edge of each side having like spaced depressions therein, each depression forming a protruding button that engages within one of said circular openings in the outer flap of the said container which has all of its upper edges rolled over and terminating in an inwardly extending lip, a removable dome-shaped lid that is rectangular when viewed from the top, the dome resting on said lips, and all four walls of the said rectangular container having a plurality of ventilation ports, each one of which is stamped outwardly from the side, the said ventilation ports being in two rows, one above the other and parallel to one another, and each ventilation port being in equal spaced relation to the other ventilation port, thereby providing means of ventilating the said container.

References Cited by the Examiner

UNITED STATES PATENTS

| | | | |
|---|---|---|---|
| 120,728 | 11/72 | Ellis | 126—275 |
| 891,085 | 6/08 | Leahy | 99—430 X |
| 1,345,824 | 7/20 | Bayless | 126—275 |
| 1,478,134 | 12/23 | Mitchell | 126—39 |
| 1,598,221 | 8/26 | Tollagsen | 126—376 |
| 1,671,450 | 5/28 | Ross | 99—447 |
| 2,156,516 | 5/39 | Schneider | 126—273 |
| 2,480,045 | 8/49 | Reeves | 126—19 X |
| 2,520,133 | 8/50 | Donovan | 126—19 |
| 2,633,840 | 4/53 | Crawford | 126—39 |
| 2,739,733 | 3/56 | Larson | 220—62 |
| 2,740,428 | 4/56 | Swett. | |
| 2,746,448 | 5/56 | Holmsten | 126—39 |
| 2,752,910 | 7/56 | Lysles | 126—19 |
| 2,912,559 | 11/59 | Kirschke | 126—39 |
| 3,036,192 | 5/62 | Fry | 126—39 |
| 3,070,879 | 1/63 | Seale | 126—39 |

FOREIGN PATENTS 633,284  12/61  Canada.

JAMES W. WESTHAVER, *Primary Examiner.*

FREDERICK L. MATTESON, Jr., PERCY L. PATRICK, *Examiners.*